United States Patent
Wakabayashi et al.

(10) Patent No.: US 12,106,769 B2
(45) Date of Patent: Oct. 1, 2024

(54) SOUND OUTPUT DEVICE AND PROGRAM

(71) Applicant: Neumo, Inc., Tokyo (JP)

(72) Inventors: Ryosei Wakabayashi, Tokyo (JP); Masashi Yamada, Tokyo (JP); Sho Hoshino, Tokyo (JP)

(73) Assignee: NEUMO, INC., Tokyo (JP)

( * ) Notice: Subject to any disclaimer, the term of this patent is extended or adjusted under 35 U.S.C. 154(b) by 115 days.

(21) Appl. No.: 17/798,011

(22) PCT Filed: Feb. 2, 2021

(86) PCT No.: PCT/JP2021/003765
§ 371 (c)(1),
(2) Date: Aug. 5, 2022

(87) PCT Pub. No.: WO2021/171933
PCT Pub. Date: Sep. 2, 2021

(65) Prior Publication Data
US 2023/0084900 A1    Mar. 16, 2023

(30) Foreign Application Priority Data
Feb. 28, 2020 (JP) .................... 2020-033781

(51) Int. Cl.
*G10L 25/51* (2013.01)
(52) U.S. Cl.
CPC .................... *G10L 25/51* (2013.01)
(58) Field of Classification Search
None
See application file for complete search history.

(56) References Cited

U.S. PATENT DOCUMENTS

2004/0043364 A1* 3/2004 Wasowicz ............... G09B 7/04
434/167
2011/0313315 A1* 12/2011 Attias ................... G16Z 99/00
600/559

(Continued)

FOREIGN PATENT DOCUMENTS

JP        7-13480 A    1/1995
JP    2001-100630 A    4/2001

(Continued)

OTHER PUBLICATIONS

Japan Patent Office, International Search Report and Written Opinion for PCT Application No. PCT/JP2021/003765, mail date Apr. 13, 2021.

*Primary Examiner* — Paul W Huber
(74) *Attorney, Agent, or Firm* — SoCal IP Law Group LLP; Mark Andrew Goldstein

(57) ABSTRACT

Provided are a program and a sound output device for maintaining the interest of the user. A sound output device 1 which outputs prescribed musical scales comprises: a level information acquisition unit 13 that acquires, as level information, a user's sense of pitch; a sound output unit 16 that outputs sound of which the pitch has been changed under prescribed conditions based on the acquired level information; a response information acquisition unit 19 that acquires, as response information, a response to the change in a musical scale input by the user on the basis of the output musical scale; a correctness determination unit 20 that determines the correctness of the acquired response information; and a level determination unit 21 that determines the level of the user's sense of pitch on the basis of the determination result.

6 Claims, 3 Drawing Sheets

(56) References Cited

U.S. PATENT DOCUMENTS

| | | | |
|---|---|---|---|
| 2015/0269852 | A1 | 9/2015 | Cecil et al. |
| 2019/0213904 | A1 | 7/2019 | Wang |
| 2019/0254572 | A1 | 8/2019 | Suwa |

FOREIGN PATENT DOCUMENTS

| | | | |
|---|---|---|---|
| JP | 2004-246231 | A | 9/2004 |
| JP | 2011-164547 | A | 8/2011 |
| JP | 2019-124907 | A | 7/2019 |
| JP | 2019-180445 | A | 10/2019 |

\* cited by examiner

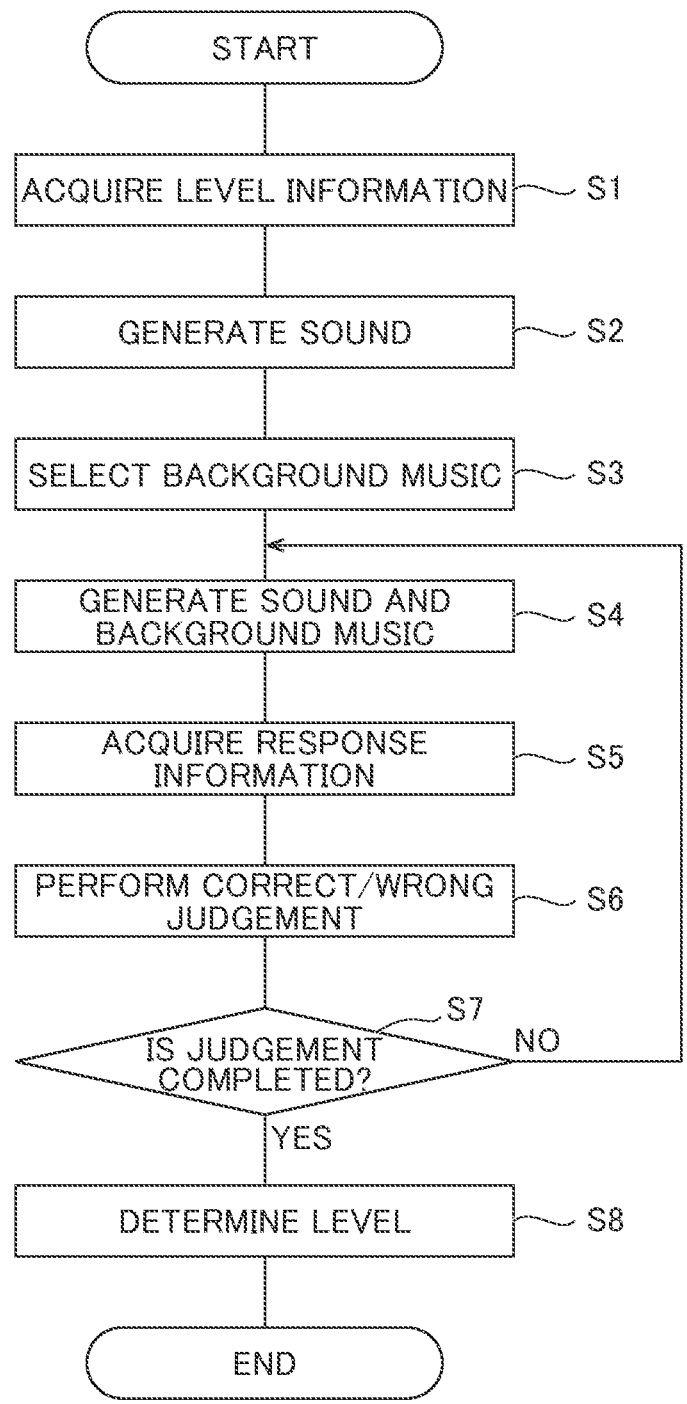

SOUND OUTPUT DEVICE AND PROGRAM

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

RELATED APPLICATION INFORMATION

This patent claims priority from International PCT Patent Application No. PCT/JP2021/003765, filed Feb. 2, 2021, entitled, "SOUND OUTPUT DEVICE AND PROGRAM", which claims priority to Japanese Patent Application No. 2020-033781, filed Feb. 28, 2020, all of which are incorporated herein by reference in their entirety.

TECHNICAL FIELD

The present invention relates to a sound output device and a program.

BACKGROUND

Conventionally, a human sense of sound has been known as a "sense of pitch". Examples of the sense of sound include a sense of height of sound, a sense of sound length, a sense of timbre, a sense of intensity of sound, and a sense of direction of sound. The sense of height of sound depends on a difference between persons. For example, in case of a semitone is shown in units of 100 cents, it is said that an ordinary person can distinguish between 10 cents and 20 cents. Further, it is said that anyone involved in music can distinguish a few cents.

Such a sense of sound can be improved by training. In this way, as a device that enables sound training, a sound quiz system has been proposed that reproduces a presented sound (for example, see Patent Document 1).
Patent Document 1: Japanese Unexamined Patent Application, Publication No. 2019-180445

SUMMARY OF THE INVENTION

Problems to be Solved by the Invention

By the way, as in disclosed in Patent Document 1, it is useful to regenerate a predetermined sound and have a user respond with the sound determined from the regenerated sound in terms of training a sense of sound. On the other hand, simply reproducing a sound and accepting a response may be apt to cause the user to lose interest. Therefore, it is preferable to carry out training such that the user does not lose interest.

The present invention is to provide a sound output device and a program that can maintain the interest of a user.

Means for Solving the Problems

The present invention relates to a sound output device that outputs a predetermined sound, the sound output device including: a level information acquisition unit that acquires, as level information, a level of a user's sense of sound; a sound output unit that outputs a sound of which sound height is changed under a predetermined condition based on the acquired level information; a response information acquisition unit that acquires, as response information, a response to the change in sound height input by the user based on the sound to be output; a correct/wrong judgement unit that judges whether the acquired response information is correct or wrong; and a level determination unit that determines the level of the user's sense of sound based on a result of judgement.

Preferably, the sound output device 1 further includes: a background music selection unit that selects background music output by overlapping with the output of the sound according to the output sound; and a background music output unit that outputs the selected background music in conformity with the output of the sound.

Preferably, the background music output unit changes and outputs a sound level of the background music according to the acquired level information.

Preferably, the sound output unit outputs a sound in which at least one selected from a height of sound, a pitch, a sound length, and a time interval between sounds is further changed, based on the level information of the user. Preferably, the response information acquisition unit acquires selection that a height of a next output sound is different from or equal to that of an immediately preceding sound, from the user.

Relates to a program for causing a computer as a sound output device for training a user's sense of sound to function as: a level information acquisition unit that acquires, as level information, a level of a user's sense of sound; a sound output unit that outputs a sound of which sound height is changed under a predetermined condition based on the acquired level information; a response information acquisition unit that acquires the selection information that shows the change in sound height input by the user based on the sound to be output; a correct/wrong judgement unit that judges whether the acquired selection information is correct or wrong; and a level determination unit that determines the level of the user's sense of sound based on a result of judgement.

Effects of the Invention

It is possible to provide a sound output device and a program that can maintain the interest of the user.

DESCRIPTION OF THE DRAWINGS

FIG. 3 is a is a flowchart showing a processing flow of the sound output device of the embodiment.

DETAILED DESCRIPTION

Preferred Mode for Carrying Out the Invention

Figure 1:
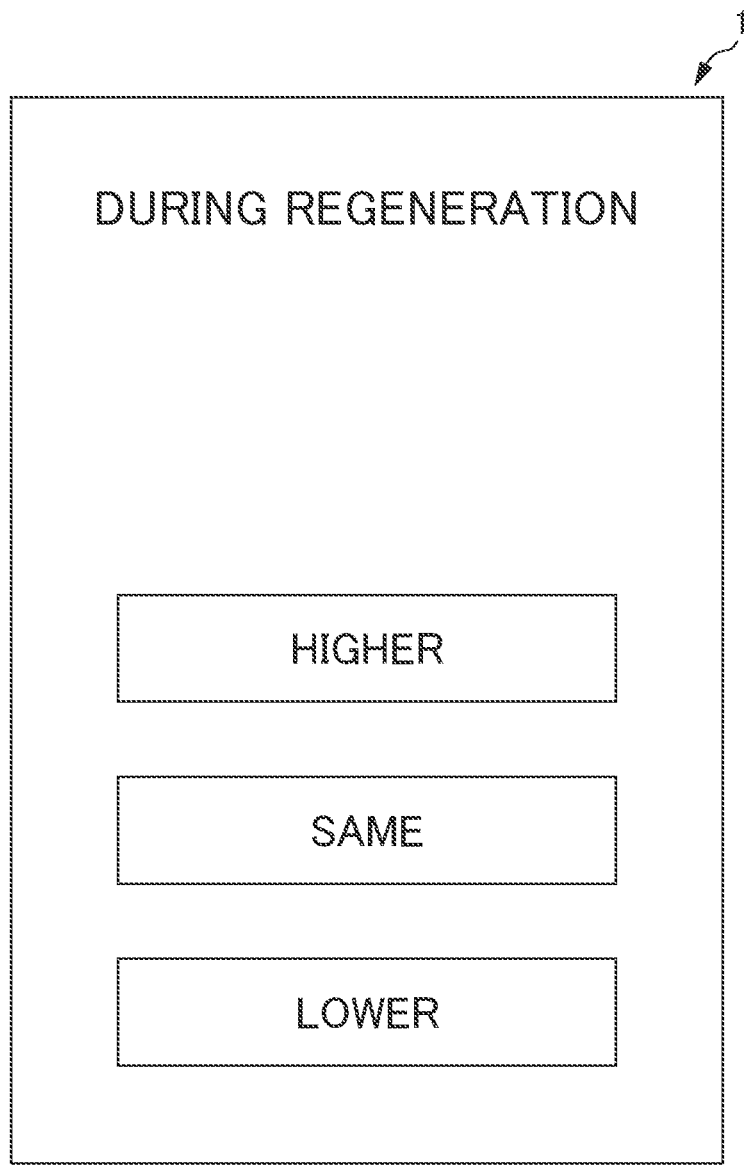
FIG. 1 is a schematic diagram showing a screen of a sound output device according to an embodiment of the present invention.
Figure 2:
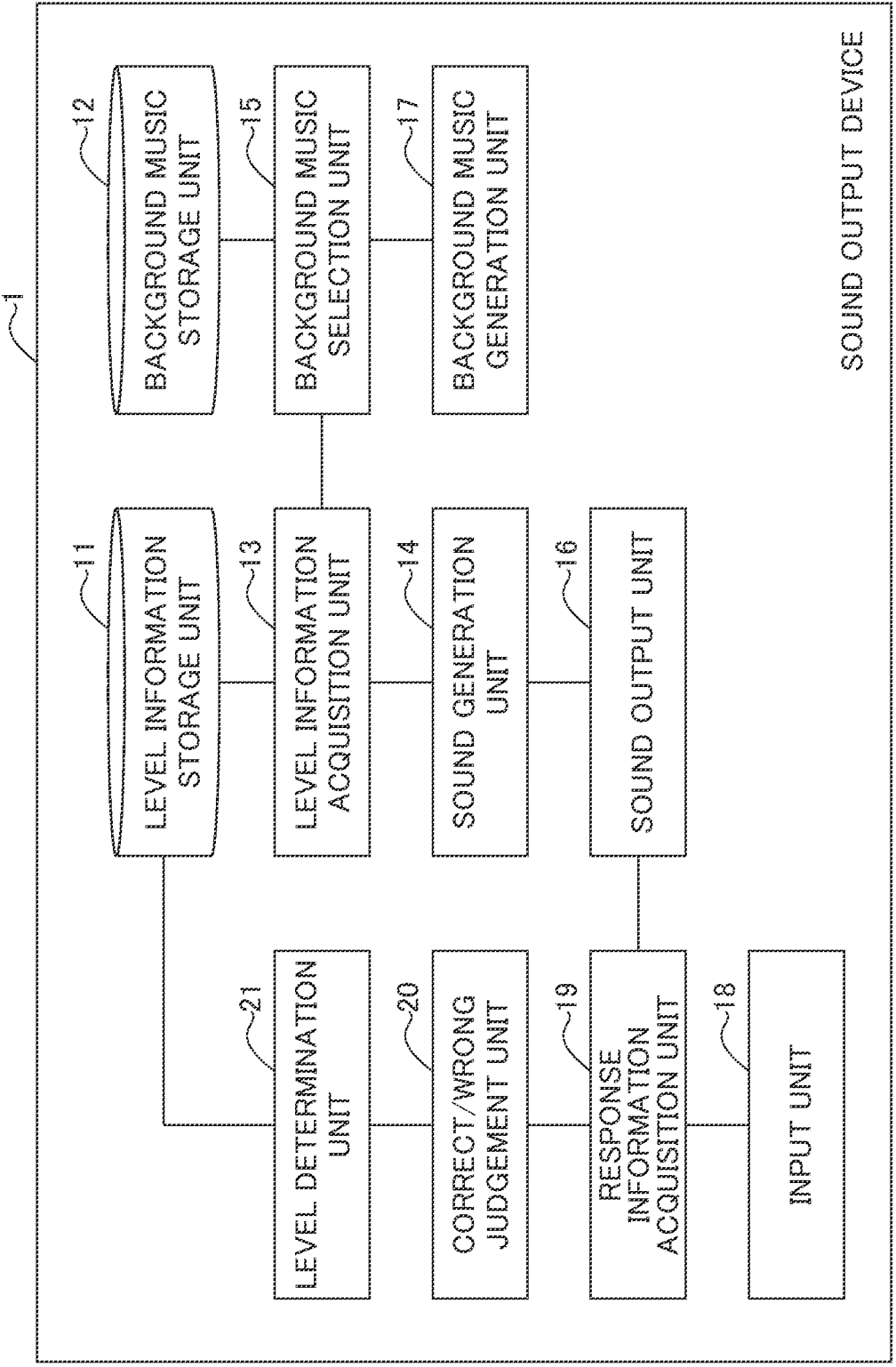
FIG. 2 is a block diagram showing a constitution of the sound output device of the embodiment.

A sound output device 1 and a program according to an embodiment of the present invention will be described below with reference to FIGS. 1 to 3. First, an outline of the sound output device 1 according to the embodiment will be described.

The sound output device 1 is a device that trains a user's sense of sound. The sound output device 1 is a computer (a mobile terminal) such as a smartphone or a tablet. Specifically, the sound output device 1 is implemented when a computer executes an application. The sound output device 1 reproduces (outputs) a plurality of sounds (hereinafter, also referred to as task sounds) generated at a predetermined height of sound, a predetermined difference between sounds (hereinafter, also referred to as a pitch), a predetermined sound length, and a predetermined time interval between sounds by overlapping with the output of the background music. As shown in FIG. 1, the sound output device 1 executes a display, in which a user selects a change in sound height with respect to a previous sound as "UP (higher)", "SAME (same)", "DOWN (lower)", in conformity with the output of the plurality of sounds. Further, the sound output device 1 accepts a response (selection) from the user. The sound output device 1 judges a level of the user according to the response from the user, and changes a height of sound, a difference between sounds, a sound length, and a time interval of a next output sound according to the result of judgement.

A constitution of the sound output device 1 according to the present embodiment will be described below. As shown in FIG. 2, the sound output device 1 includes, for example, a level information storage unit 11, a background music storage unit 12, a level information acquisition unit 13, a sound generation unit 14, a background music selection unit 15, a sound output unit 16, a background music output unit 17, an input unit 18, a response information acquisition unit 19, a correct/wrong judgement unit 20, and a level determination unit 21.

The level information storage unit 11 is, for example, a storage media such as an SSD (Solid State Drive). The level information storage unit 11 stores a level of the user's sense of sound as level information. The level information storage unit 11 stores, as level information, a determinable height of sound, a pitch, a sound length, and a time interval between sounds, for example. Further, the level information storage unit 11 may include, as level information, an ability (at least one selected from a height of sound, a pitch, a sound length, and a time interval) that the user is not good at. Here, the height of sound means a frequency of a sound. Further, the pitch means a difference between heights of two sounds. In addition, the sound length means a time interval during which the sound is sounding. Further, the time interval means a length of a time lag between two sounds.

The background music storage unit 12 is, for example, a storage media such as an SSD (Solid State Drive). The background music storage unit 12 stores background music to be output by overlapping with the sound output to the user. The background music storage unit 12 stores, for example, a binaural beat that causes brain wave attraction by listening to sounds having slightly different frequencies from both ears. Further, the background music storage unit 12 stores, for example, background music that causes a missing fundamental.

The level information acquisition unit 13 is implemented by the operation of the CPU, for example. The level information acquisition unit 13 acquires a level of the user's sense of sound as level information. The level information acquisition unit 13 acquires, for example, the level information stored in the level information storage unit 11.

The sound generation unit 14 is implemented by the operation of the CPU, for example. The sound generation unit 14 outputs a sound of which sound height is changed under predetermined conditions based on the acquired level information. The sound generation unit 14 outputs, for example, the sound of which sound height is changed based on the height of sound, the pitch, the sound length, and the time interval included in the level information. The sound generation unit 14 improves a difficulty level by generating a sound using, for example, a sound height close to the height of sound that the user is not good at. Further, the sound generation unit 14 improves a difficulty level by, for example, bring pitches closer to each other. Further, the sound output unit 16 improves a difficulty level by, for example, shortening the sound length. In addition, the sound generation unit 14 needs to memorize the previous sound by lengthening the time interval, and improves a difficulty level. Further, the sound generation unit 14 improves a difficulty level by generating a sound having a height of sound, a pitch, a sound length, or a time interval, which is not good for the user. In addition, the sound generation unit 14 improves a difficulty level according to the ease of listening, which is relatively different depending on the user.

The background music selection unit 15 is implemented by the operation of the CPU, for example. The background music selection unit 15 selects background music to be output by overlapping with the sound output according to the sound to be output. The background music selection unit 15 selects background music according to the level of the user's sense of sound included in the level information, for example. The background music selection unit 15 acquires the selected background music from a plurality of types of background music stored in the background music storage unit 12.

The sound output unit 16 is implemented by the operation of the CPU, for example. The sound output unit 16 outputs a sound of which sound height is changed under predetermined conditions based on the acquired level information. In other words, the sound output unit 16 outputs the sound generated by the sound generation unit 14. The sound output unit 16 outputs, for example, the sound generated by the sound generation unit 14 at a pitch and a sound length which are set in advance. Further, the sound output unit 16 may output a sound of which at least one selected from the height of sound, the pitch, the sound length, and the time interval is further changed, based on the level information of the user. Further, the sound output unit 16 executes a display ("Higher", "Same", "Lower") for the user to respond to the change in sound.

The background music output unit 17 is implemented by the operation of the CPU, for example. The background music output unit 17 outputs the selected background music in conformity with the output of the sound. In other words, the background music output unit 17 generates the background music selected by the background music selection unit 15. Further, the background music output unit 17 changes a sound level of the background music and outputs it according to the acquired level information. The background music output unit 17 improves a difficulty level of listening to the sound height by, for example, increasing the sound level of the background music.

The input unit 18 is, for example, a user interface such as a touch-type input device. The input unit 18 acquires a response to a change in sound height input by the user.

The response information acquisition unit 19 is implemented by the operation of the CPU, for example. The response information acquisition unit 19 acquires, as response information, the response to the change in sound height input by the user based on the sound to be output. The response information acquisition unit 19 acquires selection that the sound height of the next output sound is different from or equal to that of the immediately preceding sound, from the user, for example. Further, the response information acquisition unit 19 accepts an input of response information for a predetermined time for each output of (one) sound, for example.

The correct/wrong judgement unit 20 is implemented by the operation of the CPU, for example. The correct/wrong judgement unit 20 judges whether the acquired response information is correct or wrong. The correct/wrong judgement unit 20 judges whether the sound generated by the sound generation unit 14 and the response information acquired by the response information acquisition unit 19 are correct or wrong, for example. Further, the correct/wrong judgement unit 20 accumulates the result of judgement. The correct/wrong judgement unit 20 accumulates the result of judgement until the output of all the sounds generated by the sound generation unit 14 is completed, for example.

The level determination unit 21 is implemented by the operation of the CPU, for example. The level determination unit 21 determines a level of the user's sense of sound based on the result of judgement. The level determination unit 21 determines a level of the user's sense of sound based on a correct answer rate, for example. The level determination unit 21 determines a level of the user's sense of sound for each of the height of sound, the pitch, the sound length, and the time interval, for example. Specifically, the level determination unit 21 determines, as a level of the user's sense of sound, that the user is not good at a specific height of sound. Further, the level determination unit 21 determines, as a level of the user's pitch, that the user is not good at a specific pitch. Further, the level determination unit 21 determines, as a level of the user's sense of sound, that the user is not good at a specific sound length.

Next, the operation of the sound output device 1 will be described with reference to FIG. 3. First, the level information acquisition unit 13 acquires level information of the user (Step S1). Next, the sound generation unit 14 generates an output sound based on the acquired level information (Step S2). Next, the background music generation unit selects background music based on the acquired level information (Step S3).

Next, the sound output unit 16 outputs the generated sound (Step S4). Further, the background music output unit 17 outputs the background music by overlapping with the output sound. The sound generation unit 14 displays a display for accepting the response of the user in conformity with the output of the sound.

Next, the response information acquisition unit 19 acquires, as response information, the response from the user with respect to the output of the sound (Step S5). The correct/wrong judgement unit 20 judges whether the acquired response information is correct or wrong (Step S6).

In Step S7, the correct/wrong judgement unit 20 repeats the correct/wrong judgement until all the output of the sound are completed. When the output of the sound is completed (YES in Step S7), the process proceeds to Step S8. On the other hand, when the output of the sound is not completed (NO in Step S7), the process returns to Step S4.

In Step S8, the level determination unit 21 determines the level of the user based on the correct/wrong result (result of judgement). The level determination unit 21 stores the result of determination in the user information storage unit. Thus, the process by this flow is completed.

Next, a program will be described. Each component included in the sound output device 1 can be implemented by hardware, software, or a combination thereof. Implementation by software herein means that the device is implemented by a computer which reads and executes a program.

The program can be stored on any of a various types of non-transitory computer-readable media and can be provided to a computer. The non-transitory computer-readable media include various types of tangible storage media. Examples of non-transitory computer-readable media include magnetic storage media (such as flexible disks, magnetic tapes, hard disk drives, etc.), optical magnetic storage media (for example, magneto-optical disks), a CD-ROM (Read Only Memory), CD-R, CD-R/W, and semiconductor memories (such as a mask ROM, a PROM (Programmable ROM), an EPROM (Erasable PROM), a flash ROM, and a RAM (random access memory)). The display program may be provided using any of various types of transitory computer readable media to a computer. Examples of transitory computer readable media include electric signals, optical signals, and electromagnetic waves. Transitory computer readable media can provide the program to a computer via a wired communication line such as an electric wire or an optical fiber, or a wireless communication line.

According to the sound output device 1 and the program according to the present embodiment described above, the following effects can be achieved.

(1) The sound output device 1 is used to train the user's sense of sound, and includes: the level information acquisition unit 13 that acquires, as level information, the level of a user's sense of sound; the sound output unit 16 that outputs the sound of which sound height is changed under a predetermined condition based on the acquired level information; the response information acquisition unit 19 that acquires, as response information, the response to the change in sound height input by the user based on the sound to be output; the correct/wrong judgement unit 20 that judges whether the acquired response information is correct or wrong; and the level determination unit 21 that determines the level of the user's sense of sound based on the result of judgement. In addition, the program causes the computer as the sound output device 1, which outputs a predetermined sound, to function as: the level information acquisition unit 13 that acquires, as level information, the level of a user's sense of sound; the sound output unit 16 that outputs the sound of which sound height is changed under a predetermined condition based on the acquired level information; the response information acquisition unit 19 that acquires the selection information that shows the change in sound height input by the user based on the sound to be output; the correct/wrong judgement unit 20 that judges whether the acquired selection information is correct or wrong; and the level determination unit 21 that determines the level of the user's sense of sound based on the result of judgement. Thus, since it is possible to change the sound to be output according to the level of the user's sense of sound, it is possible to provide the sound output device 1 that can maintain the interest of the user. Further, since the sound can be output in conformity with the weakness of the user, a more user-friendly device can be provided.

(2) The sound output device 1 further includes: the background music selection unit 15 that selects the background music output by overlapping with the output of the sound according to the output sound; and the background music output unit 17 that outputs the selected background music in conformity with the output of the sound. Thus, it is possible to provide the sound output device 1 that can maintain the interest of the user.

(3) The background music output unit 17 changes and outputs the sound level of the background music according to the acquired level information. Thus, it is difficult to listen the sound by increasing the sound level of the background music, for example. Since the ability to select and listen to target sound from the surrounding sounds is required, it is possible to train the selective listening ability.

(4) The sound output unit 16 outputs the sound in which at least one selected from the height of sound, the pitch, the sound length, and the time interval between sounds is further changed, based on the level information of the user. Thus, it is possible to train any of the height of sound, the pitch, the sound length, and the time interval to overcome the user's problem. Therefore, the user's sense of sound can be trained more effectively.

(5) The response information acquisition unit 19 acquires selection that the sound height of the next output sound is different from or equal to that of the immediately preceding sound, from the user. Thus, it is easier for the user to start training than in a case of guessing in detail which sound height is output. Therefore, even a novice user can start training immediately.

Although the preferred embodiment of the sound output device 1 and the program of the present invention has been described above, the present invention is not limited to the above-described embodiment and can be appropriately changed. For example, in the above-described embodiment, the level information may include the correct answer rate of each of "Higher", "Same", and "Lower" selected by the user. The sound generation unit 14 may generate a sound in which an appearance probability is manipulated based on the correct answer rate. The sound generation unit 14 may generate a sound having a high appearance probability for an option having a low correct answer rate, for example. Thus, it is possible to provide a more user-friendly sound output device 1 that overcomes the weakness of the user.

In the above-described embodiment, the sound output device 1 may present the ear age. For example, the level information may include a listening rate of high-pitched and low-pitched sound heights for each user. The sound generation unit 14 may generate high-pitched and low-pitched sounds. The level determination unit 21 may determine the ear age for each user based on the correct answer rate. The level determination unit 21 may determine the ear age according to the correct answer rate that differs depending on the age. Further, the level determination unit 21 may present the ear age of the user based on the age of another user while comparing with the correct answer rate of another user.

In the above-described embodiment, the level information acquisition unit 13 and the background music acquisition unit are assumed to acquire the level information or the background music from the level information storage unit 11 or the background music storage unit 12, but are not limited thereto. At least one selected from the level information acquisition unit 13 and the background music acquisition unit may acquire the level information or the background music from the outside.

In the above-described embodiment, the level determination unit 21 may add a score to the correct response. The level determination unit 21 may add a high score according to the difficulty level of the sound generated by the sound generation unit 14. Thus, it is possible to enhance the game quality and to maintain the interest of the user.

In the above-described embodiment, the sound output device 1 may output sounds, for example, pure tones or musical sounds, human voices, animal cries, or living sounds. In other words, the sound output device 1 may output various types of sounds.

EXPLANATION OF REFERENCE NUMERALS

1 sound output device
13 level information acquisition unit
15 background music selection unit
16 sound output unit
17 background music output unit
19 response information acquisition unit
20 correct/wrong judgement unit
21 level determination unit It is claimed:

1. A sound output device that outputs a predetermined sound, comprising:
   a level information acquisition unit to acquire, as level information, a level of a user's sense of sound;
   a sound output unit to output a sound of which sound height is changed under a predetermined condition based on the acquired level information;
   a response information acquisition unit to acquire, as response information, a response to the change in sound height input by the user based on the sound to be output;
   a correct/wrong judgement unit to judge whether the acquired response information is correct or wrong;
   a level determination unit to determine the level of the user's sense of sound based on a result of the judgement;
   a background music selection unit to select background music output to overlap with the output of the sound according to the sound to be output; and
   a background music output unit to output the selected background music in conformity with the sound to be output.

2. The sound output device according to claim 1, wherein the background music output unit changes and outputs a sound level of the background music according to the acquired level information.

3. The sound output device according to claim 1, wherein the sound output unit outputs a sound in which at least one selected from a height of sound, a pitch, a sound length, and a time interval between sounds is further changed, based on the acquired level information.

4. The sound output device according to claim 1, wherein the response information acquisition unit acquires selection that a sound height of a next output sound is different from or equal to that of an immediately preceding sound, from the user.

5. A non-transitory computer readable medium storing a program for causing a computer to act as a sound output device for training a user's sense of sound to function as:
   a level information acquisition unit to acquire, as level information, a level of a user's sense of sound;
   a sound output unit to output a sound of which sound height is changed under a predetermined condition based on the acquired level information;
   a response information acquisition unit to acquire the selection information that shows the change in sound height input by the user based on the sound to be output;
   a correct/wrong judgement unit to judge whether the acquired selection information is correct or wrong;

a level determination unit to determine the level of the user's sense of sound based on a result of the judgement;

a background music selection unit to select background music output by overlapping with the output of the sound according to the output sound; and a background music output unit to output the selected background music in conformity with the output of the sound.

6. A sound output method performed by a sound output device for training a user's sense of sound, the method comprising:

acquiring, as level information, a level of a user's sense of sound;

outputting a sound of which sound height is changed under a predetermined condition based on the acquired level information;

acquiring, as response information, a response to the change in sound height input by the user based on the sound to be output;

judging whether the acquired response information is correct or wrong; and determining the level of the user's sense of sound based on a result of judgement, wherein the sound output method further comprises selecting background music output by overlapping with the output of the sound according to the output sound; and outputting the selected background music in conformity with the output of the sound.

* * * * *